United States Patent [19]

Creed

[11] Patent Number: 5,025,587

[45] Date of Patent: Jun. 25, 1991

[54] FISH STRINGER AND RETAINER

[76] Inventor: Ronald D. Creed, 5382 Taos, Abilene, Tex. 79605

[21] Appl. No.: 441,388

[22] Filed: Nov. 27, 1989

[51] Int. Cl.$^5$ ............................................. A01K 65/00
[52] U.S. Cl. ...................................... 43/55; 224/103; 224/252
[58] Field of Search .................. 43/55, 54.1; 224/103, 224/224, 225, 226, 252, 269, 254

[56] References Cited

U.S. PATENT DOCUMENTS

| | | | |
|---|---|---|---|
| 2,453,381 | 11/1948 | Orton | 224/7 |
| 2,536,531 | 1/1951 | Bishop | 224/103 |
| 2,567,775 | 9/1951 | Loree | 224/7 |
| 3,160,336 | 12/1964 | Flatford et al. | 224/7 |
| 3,854,638 | 12/1974 | Anderson | 224/103 |
| 4,570,836 | 2/1986 | Mayo | 224/103 |
| 4,830,244 | 5/1989 | Brannon | 224/269 |

Primary Examiner—Kurt Rowan
Assistant Examiner—James Miner
Attorney, Agent, or Firm—Dennis T. Griggs

[57] ABSTRACT

A combination fish stringer and retainer is adapted for attachment to a fisherman's belt for accommodating fishing activities such as wade fishing, inflatable tube fishing and fishing while scuba diving. The fish stringer and retainer combination includes a retainer bracket having a pair of laterally spaced arms which define a guide slot for receiving a spear point attached to a flexible stringer cord. The latch arms have projecting shoulder portions which restrict the entrance to the guide slot. Upon insertion of the spear shaft, the latch arms deflect, thereby permitting it to pass. The spear shaft can be released with one hand by simultaneously pulling upwardly on the shaft while pushing downwardly on the deflectable latch arms. The retainer bracket includes a spring clip which can be attached to a fisherman's belt, whereby the stringer and catch will trail along behind the fisherman as the fisherman moves from place to place.

10 Claims, 2 Drawing Sheets

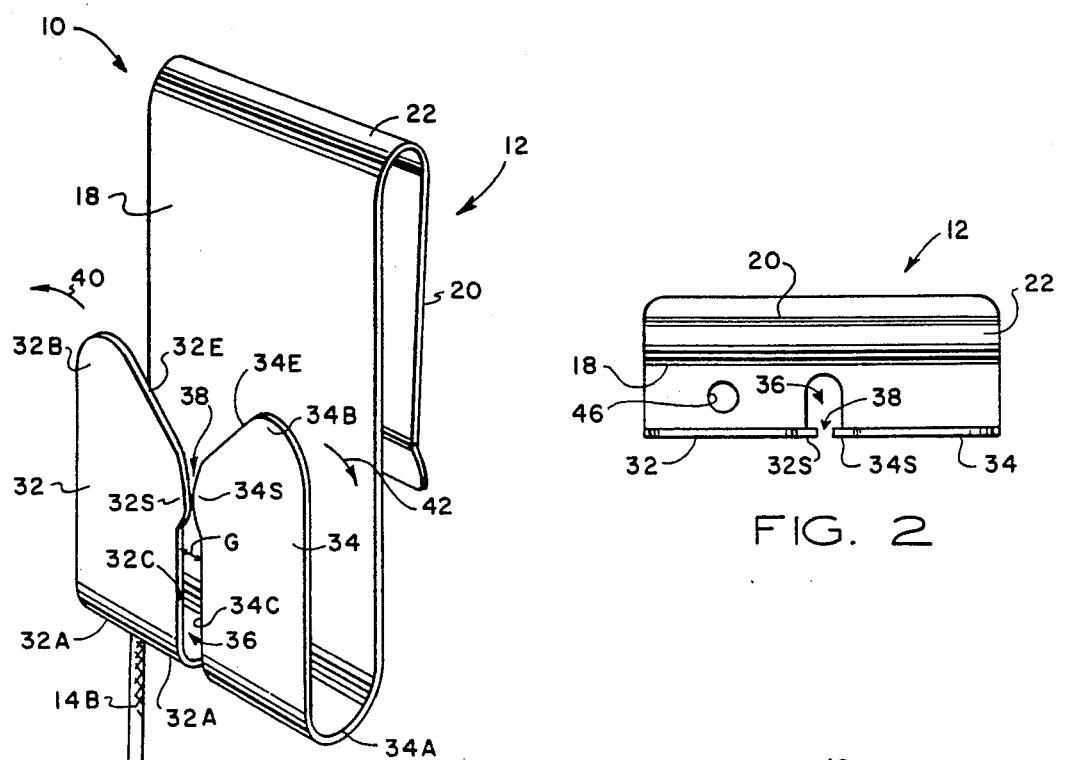
FIG. 1
FIG. 2
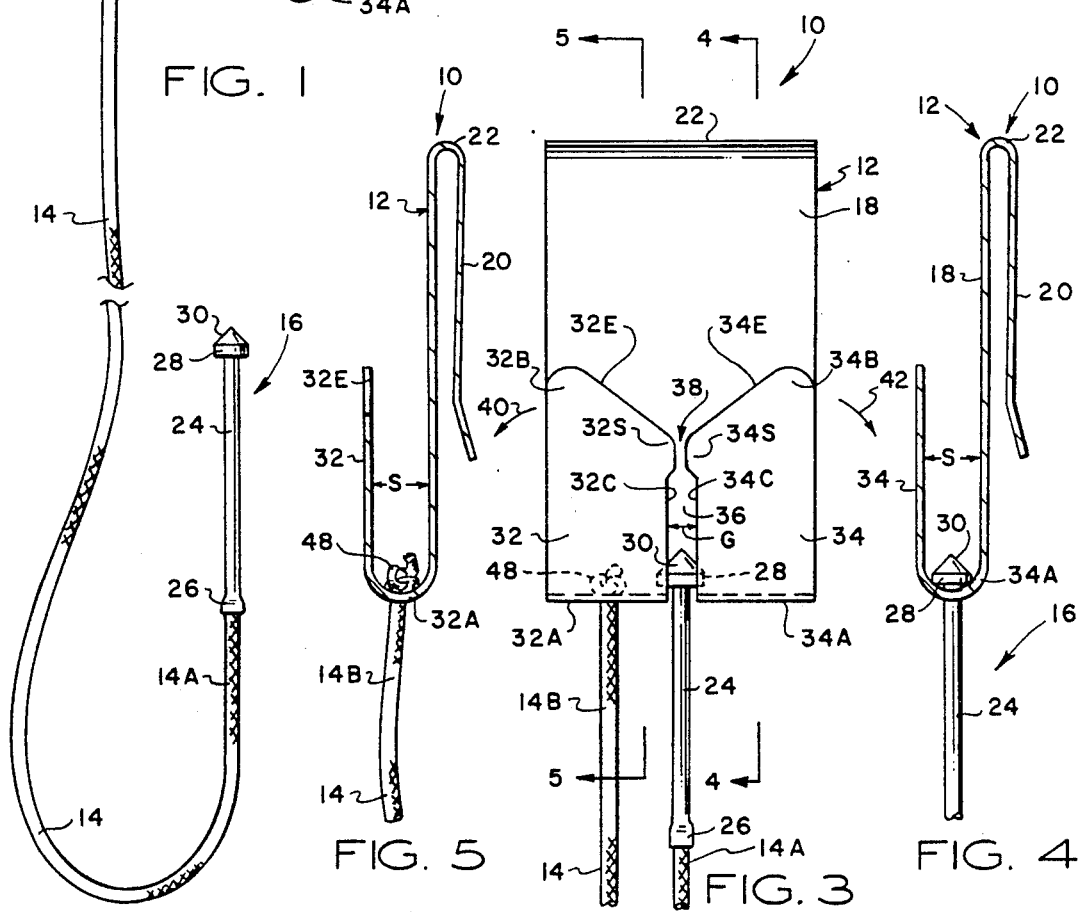
FIG. 5
FIG. 3
FIG. 4

FISH STRINGER AND RETAINER

FIELD OF THE INVENTION

This invention relates generally to fishing tackle and accessories, and in particular to an improved fish stringer and retainer combination.

BACKGROUND OF THE INVENTION

In freshwater sport fishing, game fish may be taken in a variety of ways, for example while wade fishing, inflatable tube fishing, from a small boat, from a dock, from the shore of a river, lake or pond, and even while scuba diving. It is generally desirable to keep the fish submerged in fresh water or else refrigerated after they are caught to prevent spoilage. Some small boats are equipped with a live well in which fresh water is circulated for receiving fish as they are caught Alternatively, an ice chest is maintained on some small boats for refrigerating the fish as they are caught However, some boats are not equipped with a live well or with an ice chest. Moreover, such equipment is usually not available for fishing activities such as wade fishing, inflatable tube fishing and scuba diving fishing.

DESCRIPTION OF THE PRIOR ART

Most of the advantages of a live well have been provided in such situations by the conventional fish stringer which includes a flexible cord having an elongated piercing member such as a spear connected at one end and a small metallic ring, crossbar or float connected at its opposite end. In this arrangement, fish are threaded onto the stringer as they are caught, and are then suspended in the water. The fish are secured onto the stringer by threading the spear through the natural opening connecting the gills and mouth of the fish. After the first fish is threaded onto the stringer, the spear is then fastened onto the fisherman's clothing, or fastened to the side of a boat, tied onto a tree limb or, alternatively, the spear is impaled into the ground.

A limitation on the use of the foregoing conventional stringer is that it must be untied and retied or unfastened as each fish is caught.

Another type of stringer which is in widespread use includes a cord or chain having separate latchable hook members. As each fish is caught, the entire stringer must be lifted from the water, while bearing the full weight of previously captured fish. An available hook member must be located, opened and then closed after securing the fish. That procedure requires both hands to manipulate the stringer and the latch, with the result that a fish may be lost while the fisherman attempts to manipulate the hook member.

A limitation of some fish stringer devices is that the stringer may be anchored along the shore with the fish suspended in the water, with the entire catch and stringer being remotely located with respect to the fisherman. There are various situations in which it would be desirable to releasably attach the fish stringer onto or about the fisherman, for example during wade fishing, inflatable tube fishing and scuba diving fishing. In such situations, the fish stringer and the catch would trail along automatically as the fisherman moves from place to place.

Conventional fish stringers are limited in their usefulness in such situations, because they require the fisherman to utilize both hands for unfastening or releasing the spear, and some stringers require the use of both hands to release and refasten a hook latch. In such situations, the fisherman must grip the fish with one hand while attempting to unfasten the spear or latch with his other hand.

Examples of conventional fish stringers are shown in the following U.S. patents:

| | |
|---|---|
| 2,453,381 | 2,567,775 |
| 3,160,336 | 3,854,638 |
| 4,570,836 | |

OBJECTS OF THE INVENTION

Accordingly, the principal object of the present invention is to provide an improved fish stringer and retainer assembly in which the fish stringer can be quickly and easily removed from the retainer with one hand.

A related object of the invention is to provide an improved fish stringer and retainer assembly of the type described, wherein the retainer can be securely and releasably fastened onto a fisherman's belt, whereby the stringer and catch will trail along behind the fisherman as the fisherman moves from place to place during wade fishing, inflatable tube fishing, scuba fishing and the like.

Yet another object of the invention is to provide an improved fish stringer and retainer assembly which is adapted for releasable attachment to a bracket which is secured onto a rigid structure such as a boat or dock.

Still another object of the invention is to provide an improved retainer for use in combination with a fish stringer of the type having a flexible cord and an elongated spear, in which the elongated spear is releasably secured against release while the retainer is carried or otherwise moved about by a fisherman or by movement of a boat.

SUMMARY OF THE INVENTION

The foregoing objects are achieved according to the present invention by an improved fish stringer and retainer combination in which a retainer bracket is adapted for releasable connection to a mounting plate attached to the side of a boat or the side rail of a dock, for example, and for releasable attachment to a fisherman's belt for accommodating fishing activities such as wade fishing, inflatable tube fishing and fishing while scuba diving. In the preferred embodiment, the fish stringer and retainer combination includes a retainer bracket having a pair of laterally spaced latch arms which define a guide slot for receiving a spear point attached to a flexible stringer cord. In that arrangement, a spear point is attached to an elongated shaft, with the shaft having a diameter which is less than the guide slot dimension, and with the spear point having a head portion which is greater than the guide slot width.

In one embodiment, the free end of the fish stringer cord is attached to the retainer bracket, and the spear is inserted into the guide slot with the spear point being received between the latch arms and the base plate. The spear shaft projects downwardly, while the spear point is retained by transverse connecting portions of the latch arms.

According to one aspect of the invention, the latch arms have facing edge portions which are separated by the guide slot with each latch arm having a shoulder portion projecting laterally into the guide slot, thereby defining a relatively narrow entrance opening to the guide slot. According to this arrangement, the latch arms deflect slightly as the spear shaft is inserted into the entrance opening and displaced along the guide slot. The separation distance between the projecting shoulder portions provides a releasable pressure latch. The fisherman can release the spear with one hand by placing his thumb on top of the latch arms and pulling upwardly on the spear shaft with the fingers of the same hand. The latch arms deflect outwardly to permit passage and release of the spear shaft.

The above noted features and advantages of the invention as well as other superior aspects thereof will be further appreciated by those skilled in the art upon reading the detailed description which follows with reference to the accompanying drawings.

BRIEF DESCRIPTION OF THE DRAWINGS

FIG. 1 is a perspective view of a fish stringer and retainer assembly constructed according to the present invention;

FIG. 2 is a top plan view of the retainer bracket shown in FIG. 1;

FIG. 3 is a front elevational view, partially broken away, of the fish stringer and retainer assembly shown in FIG. 1;

FIG. 4 is a sectional view taken along the lines 4—4 of FIG. 3;

FIG. 5 is a sectional view taken along the lines 5—5 of FIG. 3;

DETAILED DESCRIPTION OF THE PREFERRED EMBODIMENT

Figure 6:
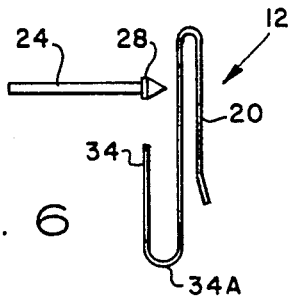
FIG. 6, FIG. 7 and FIG. 8 are simplified side elevational views which illustrate latching engagement of a fish stringer spear with the retainer bracket of FIG. 1.

In the description which follows, like parts are marked throughout the specification and drawings with the same reference numerals, respectively.

Referring now to FIG. 1, a fish stringer and retainer assembly 10 includes a retainer bracket 12, a flexible fish stringer cord 14 and a spear 16. In this embodiment, one cord end portion 14A is attached to the spear 16, and the opposite end portion 14B is connected to terminal means, in this case the retainer bracket 12. However, in an alternative embodiment, the opposite cord end portion 14B is attached to other terminal means, for example a crossbar, float or ring.

Figure 9:
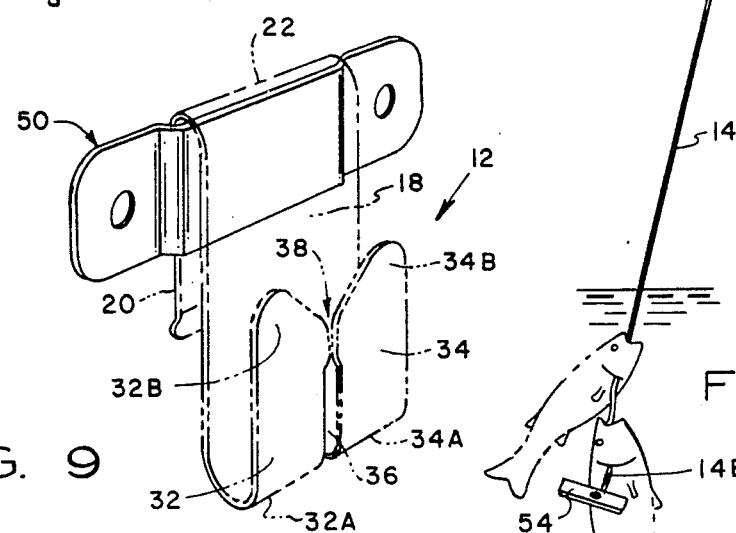
FIG. 9 is a perspective view, with the retainer bracket of FIG. 1 being shown in phantom, which illustrates attachment of the retainer bracket to a fixed mounting plate.
Figure 10:
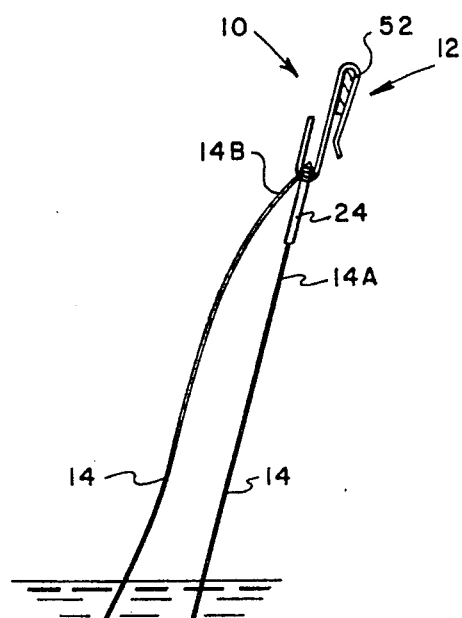
FIG. 10 is a side elevational view which illustrates the fish stringer retainer assembly of the present invention, with one end of a flexible stringer cord being attached to the retainer bracket; and, FIG. 11 is a view similar to FIG. 10, in which the fish stringer cord is suspended from the retainer bracket, with the free end of the cord being connected to a cross bar.
Figure 11:
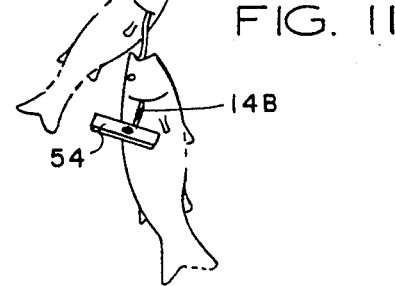

According to an important feature of the invention, the retainer bracket 12 is adapted for releasable attachment to a mounting plate (as shown in FIG. 9) or to a fisherman's belt, as shown in FIGS. 10 and 11. For this purpose, the retainer bracket 12 includes a supporting member in the form of a base plate 18 and a resilient spring clip 20 which is attached to the base plate 18 by a transverse connecting portion 22. Preferably, the transverse connecting portion 22 is curved in the form of a half cylinder, with the spring clip 20, transverse connecting portion 22 and supporting base plate 18 being integrally formed of a durable material, for example aluminum. As can be seen in FIGS. 4 and 5, the spring clip 20 extends transversely with respect to the base plate 18. According to this arrangement, the spring clip is resilient and applies a compressive grip onto external mounting means, for example a mounting plate or a fisherman's belt.

The fish stringer portion of the assembly is provided by the flexible cord 14 and the spear 16. The spear 16 includes an elongated shaft 24. The spear shaft 24 is a hollow, aluminum tube which is attached to the cord end portion 14A by a crimp connection 26. The distal end of the spear shaft 24 is terminated by a spearhead 28 from which a conical spear point 30 projects.

The retainer function is provided by a pair of latch arms 32, 34 which are attached to the lower end of the base plate 18. The latch arms 32, 34 are attached to the base plate by transverse connecting portions 32A, 34A, respectively. Preferably, the transverse connecting portions are curved in semi-cylindrical form.

Figure 7:
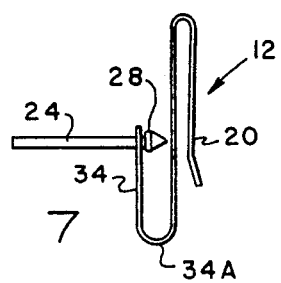
Figure 8:
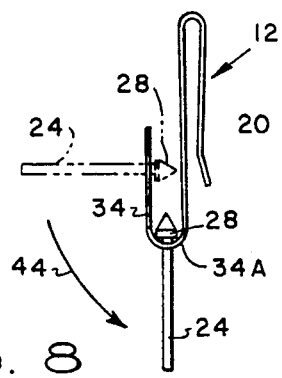

The latch arms 32, 34 are substantially coplanar, and are spaced with respect to the base plate 18 by a distance "S" of a size to accommodate the spearhead 28 and point 30 in the manner illustrated in FIG. 6, FIG. 7 and FIG. 8.

According to an important feature of the invention, the latch arms are laterally spaced with respect to each other, thereby defining a guide slot 36. The latch arms are separated by the guide slot 36 by a distance "G" as shown in FIG. 1 and FIG. 3. The spear shaft 24 has a diameter which is less than the lateral dimension "G" of the guide slot 36, and the diameter of the spearhead 28 is greater than the guide slot dimension "G". According to this arrangement, the spearhead 28 is retained by the transverse connecting portions 32A, 34A as shown in FIG. 3.

According to another aspect of the preferred embodiment, each latch arm has a projecting shoulder portion 32S, 34S, respectively. The shoulder portions project laterally into the guide slot 36, and are laterally spaced with respect to each other, thereby defining a relatively narrow entrance opening 38 for the guide slot 36.

Referring again to FIG. 2, the guide slot 36 extends intermediate the transverse connecting portions 32A, 34A. After a fish has been threaded onto the flexible cord 14, the spear shaft 24 is inserted through the restricted opening 38 and is displaced along the guide slot 36, with the shaft 24 rotating from the horizontal position as shown in FIG. 6 and FIG. 7 to the vertical position as shown in FIG. 8. In the vertical position, the spearhead 28 is engaged on opposite sides by the transverse connecting portions 32A, 34A. In this arrangement, the latch arms 32, 34 are spaced with respect to the base plate by a distance great enough to receive the spearhead 28 as the spear shaft 24 is displaced through the guide slot 36. The spacing distance is indicated by "S" in FIGS. 4 and 5.

According to another feature of the preferred embodiment, the latch arms 32, 34 have facing edge portions 32C, 34C which extend generally in parallel with each other along an intermediate section of each latch arm, substantially coextensive with the elongated slot opening 36. The facing edge portions converge toward each other in the constricted entrance region 38 on the faces of the projecting shoulder portions 32S, 34S. The edge portions 32E, 34E diverge with respect to each other along the terminal end portions 32B, 34B, respectively.

The edge portions 32E, 34E may be considered to converge downwardly toward each other in the constricted entrance region 38 relative to the distal end portions 32B, 34B, respectively. The downwardly converging slope of the edge portions 32E, 34E guide the spear shaft 24 into the constricted entrance region 38. As the spear shaft 24 is pressed downwardly, the latch arms 32, 34 deflect in opposite directions as indicated by the arrows 40, 42 (FIG. 1). As the latch arms deflect, the spear shaft 24 drops through the guide slot 36, and is guided in rotation as indicated by the arrow 44 to an upright, suspended position as indicated in FIG. 8. The spearhead 28 is held securely by the opposite transverse connecting portions 32A, 34A, respectively. The spear shaft 24 and flexible cord 14 are suspended from the retainer bracket 12 as indicated in FIG. 10 and FIG. 11.

Referring now to FIG. 2, FIG. 5 and FIG. 10, the terminal end portion of the stringer cord 14 is connected to the retainer bracket through a bore 46 which intersects the transverse connecting portion 32A (FIG. 2). In this arrangement, the terminal end portion of the cord 14 is inserted through the bore 46, and is tied in a knot 48. The knot 48 has a diameter larger than the bore 46, and is supported by the transverse connecting portion 32A.

Inadvertent release of the spear shaft 24 is prevented by the wedging action of the projecting shoulder portions 32S, 34S. Moreover, the guide slot G and the diameter of the spear shaft 24 are selected to permit the spear shaft 24 to move freely along the guide slot substantially without drag or frictional interference. The shoulder projections 32S, 34S function as a releasable latch because of the wedging resistance imposed. However, the wedging resistance can be overcome by a firm hand grip action as previously discussed.

After a fish has been caught, the spear is released by rotating the spear shaft 24 to the horizontal position as shown in FIG. 7 and then lifting upwardly on the shaft while pushing downwardly on the retainer bracket to obtain complete release of the spear as shown in FIG. 6. The spear is then ready to be inserted through the gill and mouth passage of the fish.

The retainer bracket 12 can be clipped onto a mounting plate 50 as shown in FIG. 9, which may be mounted onto the side of a boat or onto a dock. Alternatively, the mounting bracket can be clipped onto a fisherman's belt 52 as illustrated in FIG. 10 and FIG. 11. In the arrangement of FIG. 10, the terminal end portion 14B of the fish stringer is attached to the retainer bracket 12. In an alternative arrangement as shown in FIG. 11, the terminal end portion of the fish stringer 14 is attached to a crossbar 54, with the full length of the fish stringer cord 14 being suspended and permitted to float freely.

Although the invention has been described and illustrated with respect to certain preferred embodiments, it is understood that the present disclosure has been made by way of example only and that numerous changes in the arrangement and combination of parts may be made by those skilled in the art without departing from the spirit and scope of the invention as hereinafter claimed.

What is claimed is:

1. An improved fish stringer and retainer comprising, in combination:
    a retainer bracket having a base plate and first and second resilient latch arms attached to said base plate, said first and second latch arms each having a connecting portion extending transversely with respect to each latch arm and said base plate, respectively, said latch arms and connecting portions being laterally spaced with respect to each other, respectively, thereby defining a guide slot therebetween and said latch arms being transversely offset with respect to said base plate, thereby defining an open space between each latch arm and said base plate for permitting travel of a spear head through said open space;
    a flexible cord having a first end portion adapted for attachment to a spear and having a second end portion adapted for attachment to terminal means;
    an elongated spear attached to the first nnd portion of said cord, said elongated spear having a shaft and a spear head attached to said shaft, said shaft having a diameter which is less than the lateral dimension of said guide slot, and said spear head having a radially projecting head portion which exceeds the lateral dimension of said guide slot; and,
    each latch arm having a shoulder portion projecting into said guide slot, said shoulder portions being laterally spaced with respect to each other, thereby defining a constricted entrance opening to said guide slot, the lateral dimension of said entrance opening being smaller than the diameter of said spear shaft, and said latch arms being outwardly deflectable with respect to each other to enlarge the entrance opening and permit said spear shaft to be inserted into and removed out of said guide slot.

2. Fish stringer apparatus as defined in claim 1, including a spring clip connected to said base plate, said spring clip having a connecting portion extending transversely with respect to said base plate.

3. Fish stringer apparatus as defined in claim 2, wherein said spring clip is integrally formed with said base plate, and wherein said spring clip extends transversely with respect to said base plate and with respect to said connecting portion.

4. Fish stringer apparatus as defined in claim 1, wherein said latch plate connecting portion of each latch arm is curved.

5. Fish stringer apparatus as defined in claim 1, wherein said first and second latch arms are substantially aligned in coplanar relationship with each other.

6. Fish stringer apparatus as defined in claim 1, wherein said first and second latch arms have facing edge portions which are separated by said guide slot, said facing edge portions extending generally in parallel with each other along an intermediate section of each latch arm, and diverging with respect to each other along terminal end portions thereof, respectively.

7. Fish stringer apparatus as defined in claim 1, said base plate having terminal means and the second end portion of said flexible cord is connected to said base plate terminal means.

8. Fish stringer apparatus as defined in claim 8, wherein said base plate terminal means comprises a bore intersecting one of said transverse connecting latch arm portions, the second end of said cord being extended through said bore, and said cord being terminated by a knot which has a diameter larger than said bore.

9. Fish stringer apparatus as defined in claim 1, wherein the second end portion of said cord is attached to an elongated crossbar.

10. Fish stringer apparatus as defined in claim 1, wherein said base plate and latch arms are integrally formed.

* * * * *